Oct. 9, 1923.

C. H. BASSETT

LATHE DOG

Filed July 20, 1921

1,470,346

INVENTOR
Charles H. Bassett
BY
Wooster & Davis
ATTORNEYS

Patented Oct. 9, 1923.

1,470,346

UNITED STATES PATENT OFFICE.

CHARLES H. BASSETT, OF BRIDGEPORT, CONNECTICUT.

LATHE DOG.

Application filed July 29, 1921. Serial No. 486,165.

*To all whom it may concern:*

Be it known that I, CHARLES H. BASSETT, a citizen of the United States, residing at Bridgeport, county of Fairfield, State of Connecticut, have invented an Improvement in Lathe Dogs, of which the following is a specification.

In the old type of lathe dog employing a set-screw for securing it to the work, as the size of the screw was necessarily limited, the end of the screw marred the work by scoring and forming a depression therein. This was especially noticeable in use on finished work. This effect was caused partly by the relative turning of the end of the set screw on the work when it was tightened. These dogs were also liable to loosen in operation requiring continuous tightening. They also required considerable time in applying and removing from the work as a wrench had to be applied to the head each time, and the time required in setting up and taking down was a very considerable part of the time required for the job, especially in quantity production and cases where a comparatively small amount of lathe work was required for each piece. The old type of dog was further unsatisfactory as under continued use the end of the set screw grew larger making it very difficult to remove from the holder, and the threads on the screw wore out quickly.

My invention has, therefore, for an object to provide a lathe dog which will be self-setting and releasing. It is also an object of the invention to produce a dog which may be easily and quickly adjusted for various sizes of work. It is a further object of the invention to provide a device of this type which will automatically increase its grip on the work as the resistance to turning of the work increases. A further object is to provide a dog with a large work gripping surface so that it will effectively grip the work without marring the same and it is a still further object of the invention to provide a lathe dog which will be simple in construction and will, therefore, be strong and not liable to breakage, which will be comparatively cheap to manufacture and especially can be easily and quickly applied and removed from the work.

Figure 1:
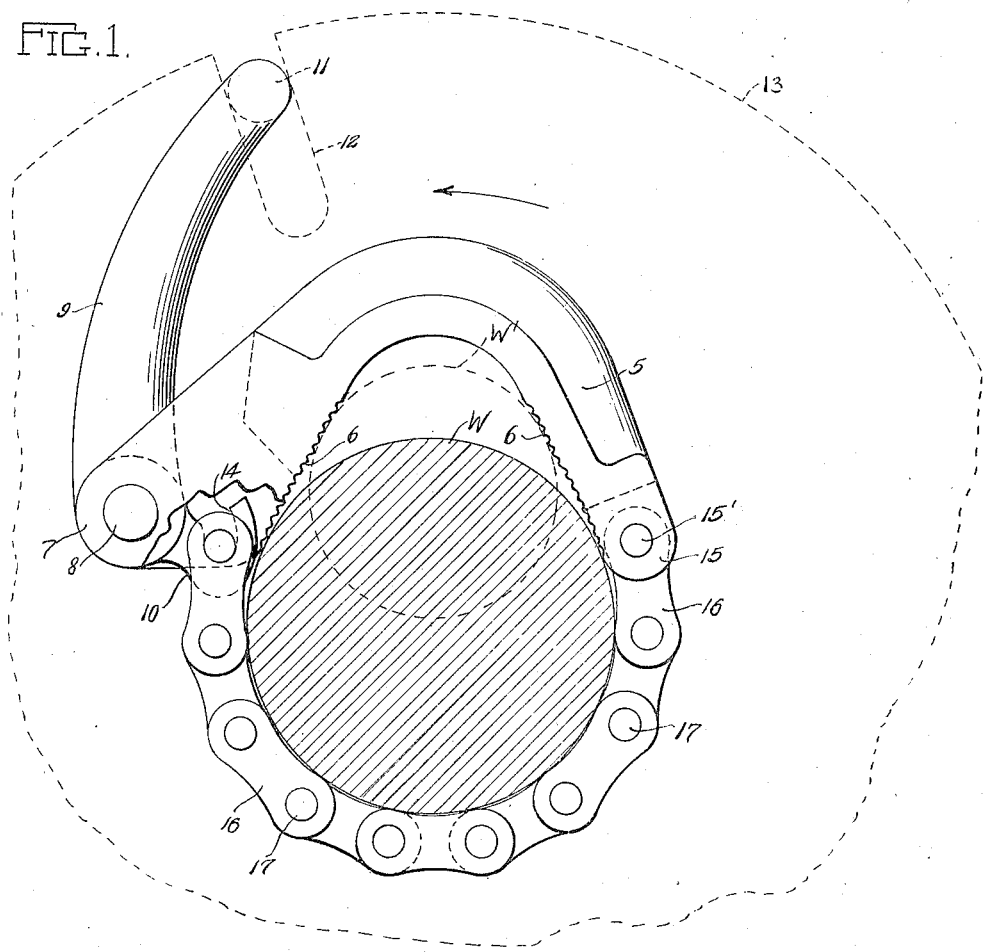

With the foregoing and other objects in view I have devised the improved lathe dog illustrated in the accompanying drawings in which, Fig. 1 is a side elevation of my improved lathe dog in working position.

Figure 2:
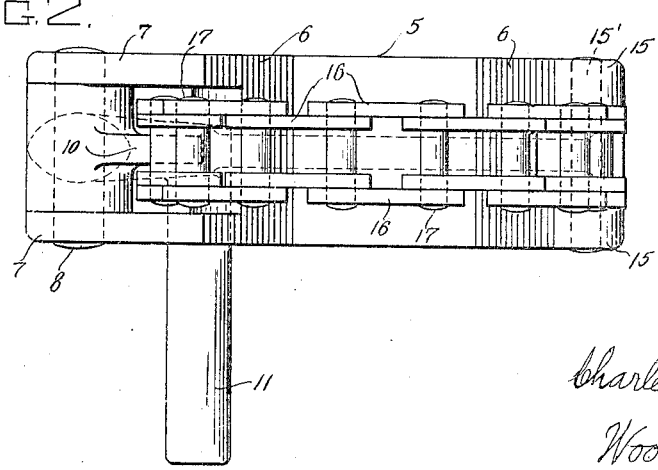

Fig. 2 is a bottom plan view of Fig. 1.

Reference numeral 5 indicates a block substantially V-shaped and preferably roughened on the inner side of the legs of the V, or provided with small teeth as shown at 6, to facilitate gripping of the work. The block has a curved portion joining the legs of the V preferably T-shaped in cross section, as this gives a stronger and lighter construction. One of the legs of the V block is provided at the free ends thereof with spaced ears 7 between which is fulcrumed, by means of a suitable bolt 8, a lever provided with a relatively long arm 9 and a relatively short arm 10. The longer arm 9 is provided at the free end thereof with a pin 11 adapted to be inserted in a slot 12 in the face plate 13 of a lathe. The shorter arm 10 is provided with a recess 14 which produces a substantially hook-shaped member for a purpose presently to be described.

The other leg of the block is provided with spaced ears 15 between which is pivoted at 15′ a clamping member which may be of various structures but preferably is formed of a piece of chain comprising a series of spaced links 16 pivotally connected together by means of suitable pins 17. The links are spaced a sufficient distance transversely to receive the short arm 10 of the lever between them and to allow the placing of any pin 17 within the recess 14 as desired. This provides a convenient means of adjusting the working length of the flexible clamping element depending on the size of the work to be gripped thereby.

In operation the block 5 is placed on the work and the chain wrapped around the other side of same and one of the pins 17 placed in the recess 14. The pin 11 is then inserted in a convenient slot 12 of the face plate. The face plate rotates in the direction indicated by the arrow and it will be apparent from an inspection of Fig. 1 that the reaction of the slot 12 on the pin 11 tends to rotate the lever counter-clockwise about the fulcrum 8, as viewed in Fig. 1. Movement of the lever arm 10 will draw upon the end of the chain attached thereto and firmly clamp the same about the work W. It will be obvious that the greater the resistance to the rotation of the work, the greater will be the clamping effect thereon.

It will also be clear that various sizes of work may be expeditiously clamped in the dog, but with smaller work indicated in dotted lines W′, the lever 8 should be connected to chain lengths nearer the connection to the pivot 15′, and different sizes of work between these two extremes would be taken care of by connecting to the intermediate chain pins. By rotation of the face plate in the opposite direction or a slight rotation of the work, the dog will be released. It will thus be obvious that the dog is self setting and releasing. Furthermore, because of the large bearing surface on the work, there is little danger of marring the surface thereof. One of its chief advantages is the ease and rapidity with which the dog may be applied to the work and the work released therefrom. This is especially valuable in quantity production where the same operations are performed on a large number of similar pieces. It will also be noted that, because of the simple construction and comparatively few parts involved, the device is comparatively cheap to manufacture, is strong and rigid and not likely to get out of order.

Having thus set forth the nature of my invention, what I claim is:

1. A lathe dog comprising a V-block adapted to receive work between the legs thereof a lever fulcrumed on one leg of the block and provided with a projection for insertion in a face plate, a flexible clamping element attached to the other leg of the block, and means for detachably connecting said flexible element to the lever whereby it may be clamped about the work.

2. A lathe dog comprising a V-block adapted to receive work between the legs thereof a lever fulcrumed on one leg of the block and one arm thereof provided with means whereby it may be attached to a face plate, a flexible chain clamping element attached to the other leg of the block, and the other arm of the lever being provided with a hook-shaped recess adapted for detachable connection with said chain where it may be clamped about said work.

3. A lathe dog comprising a V-block adapted to receive work between the legs thereof a lever fulcrumed in one leg of the block and having means on one arm thereof whereby it may be attached to a face plate, a flexible clamping element connected to the other leg of the block, and comprising a series of transversely spaced chain links pivotally connected by a series of pins, and the other arm of the lever adapted for insertion between the links and provided with a recess to receive anyone of said pins whereby the clamping element may be clamped about the work.

4. A lathe dog comprising a V-block adapted to receive work between the legs thereof a lever fulcrumed on one leg of the block and having one arm thereof provided with means whereby it may be attached to a face plate, and a clamping element pivoted to the other leg of the block and having means for connection with the other arm of the lever whereby it may be clamped against the work.

In testimony whereof I affix my signature.

CHARLES H. BASSETT.